US010233518B2

(12) United States Patent
Liu et al.

(10) Patent No.: US 10,233,518 B2
(45) Date of Patent: *Mar. 19, 2019

(54) METAL-COATED STEEL STRIP

(75) Inventors: Qiyang Liu, Mount Keira (AU); Joe Williams, Woonona (AU); Ross McDowall Smith, Cordeaux Heights (AU)

(73) Assignee: Bluescope Steel Limited, Melbourne, Victoria (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/439,605

(22) PCT Filed: Aug. 30, 2007

(86) PCT No.: PCT/AU2007/001265
§ 371 (c)(1),
(2), (4) Date: Mar. 27, 2009

(87) PCT Pub. No.: WO2008/025086
PCT Pub. Date: Mar. 6, 2008

(65) Prior Publication Data
US 2010/0021760 A1    Jan. 28, 2010

(30) Foreign Application Priority Data
Aug. 30, 2006  (AU) ................................ 2006904727

(51) Int. Cl.
C22C 21/10        (2006.01)
B32B 15/01        (2006.01)
(Continued)

(52) U.S. Cl.
CPC ............ *C22C 21/10* (2013.01); *B32B 15/012* (2013.01); *C23C 2/02* (2013.01); *C23C 2/06* (2013.01);
(Continued)

(58) Field of Classification Search
CPC ....................................................... B32B 15/01
(Continued)

(56) References Cited

U.S. PATENT DOCUMENTS 4,169,426 A    10/1979  Kornmann et al.
5,217,759 A *  6/1993   Lamberigts ............... C23C 2/06
                                                         427/433
(Continued)

FOREIGN PATENT DOCUMENTS

EP     0356138 B1    10/1993
JP     57-110658     7/1982
(Continued)

OTHER PUBLICATIONS

Davis, Joseph R.; "Aluminum and Aluminum Alloys"; J.R. Davis and Associates; ASM International Handbook Committee; ASM International; 1993; p. 221.*
(Continued)

*Primary Examiner* — Humera N Sheikh
*Assistant Examiner* — Xiaobei Wang
(74) *Attorney, Agent, or Firm* — Michael Best & Friedrich LLP

(57)  ABSTRACT

A steel strip having a coating of an aluminium-zinc-silicon alloy on at least one surface of the strip is disclosed. The strip is characterised in that the aluminium-zinc-silicon alloy contains less than 1.2 wt. % silicon and also contains magnesium. A method of forming a coating of an aluminium-zinc-silicon alloy on a steel strip is also disclosed. The method includes moving steel strip upwardly through a coating pot containing a bath of an aluminium-zinc-silicon alloy and having an opening in a bottom wall of the pot and forming a coating of the alloy on the strip. The method is
(Continued)

characterized by minimizing residence time of steel strip in contact with the aluminium-zinc-silicon alloy bath in the pot.

5 Claims, 1 Drawing Sheet

(51) Int. Cl.
    *C23C 2/02*     (2006.01)
    *C23C 2/06*     (2006.01)
    *C23C 2/12*     (2006.01)
    *C23C 2/40*     (2006.01)

(52) U.S. Cl.
    CPC .................. *C23C 2/12* (2013.01); *C23C 2/40* (2013.01); *Y10T 428/12757* (2015.01)

(58) Field of Classification Search
    USPC .......................................... 428/653; 427/433
    See application file for complete search history.

(56) References Cited

U.S. PATENT DOCUMENTS

| | | | |
|---|---|---|---|
| 5,702,528 | A | 12/1997 | Paramonov et al. |
| 6,468,674 | B2 * | 10/2002 | Friedersdorf et al. ........ 428/653 |
| 6,635,359 | B1 * | 10/2003 | Kurosaki et al. ............. 428/653 |
| 2003/0072963 | A1 | 4/2003 | Komatsu et al. |
| 2006/0153992 | A1 | 7/2006 | Tenkckhoff et al. |
| 2006/0177687 | A1 * | 8/2006 | Renshaw et al. ............. 428/653 |

FOREIGN PATENT DOCUMENTS

| | | | | |
|---|---|---|---|---|
| JP | | 58-006965 | | 1/1983 |
| JP | | 62-027558 | | 2/1987 |
| JP | | 63-317656 | | 12/1988 |
| JP | | 02-073954 | | 3/1990 |
| JP | | H10152765 | A | 6/1998 |
| JP | | 2000-328214 | | 11/2000 |
| JP | | 2001-089838 | | 4/2001 |
| JP | | 2001316791 | A * | 11/2001 |
| JP | | 2002-129300 | * | 5/2002 ............ C23C 2/06 |
| JP | | 2002-180225 | | 6/2002 |
| JP | | 2003-013192 | | 1/2003 |
| JP | | 2003-183796 | | 7/2003 |
| JP | | 2003-268519 | | 9/2003 |
| JP | | 2004-277839 | * | 10/2004 ............ C23C 30/00 |
| JP | | 2005-133151 | | 5/2005 |
| JP | | 2006-016674 | | 1/2006 |
| JP | | 2006-022409 | | 1/2006 |
| JP | | 2006-124824 | | 5/2006 |
| JP | | 2006-193791 | | 7/2006 |
| JP | | 2006-219716 | | 8/2006 |
| JP | | 2007-002288 | | 1/2007 |
| WO | | 84/00039 | | 1/1984 |
| WO | WO | 2004/083480 | | 9/2004 |
| WO | | 2006/105593 | A1 | 10/2006 |

OTHER PUBLICATIONS

PCT/AU2007/001265 International Search Report.
Japanese Patent Office Publication Submission Brief for Application No. 2009-525859 dated Aug. 29, 2013.
Japanese Patent Office Publication Submission Brief for Application No. 2009-525859 dated Sep. 24, 2013.
Japanese Patent Office Action for Application No. 2009-525859 dated Feb. 12, 2014 (8 pages—including English translation).
Jiang Xu, "Nucleation and growth of 55% Al—Zn alloy on steel substrate," University of Wollongong Theses Collection, May 2005 (167 pages).
Matsunaga et al., "Influence of coating condition on spangles of 55% Al—Zn alloy coated steel sheet," CAMP-ISIJ vol. 8 (1995)—654 (3 pages including English translation).

* cited by examiner

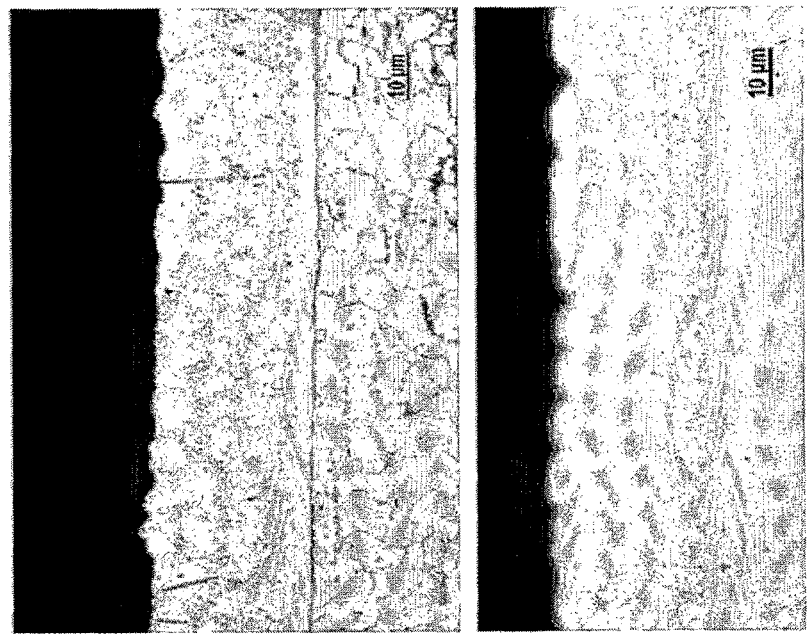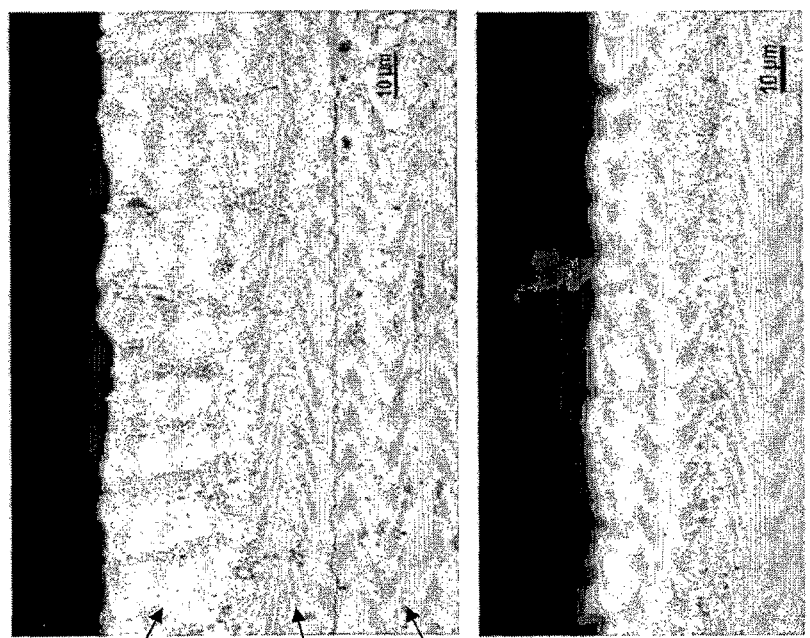

METAL-COATED STEEL STRIP

The present invention relates to steel strip that has a corrosion-resistant metal coating that is formed on the strip by coating the strip in a molten bath of coating metal.

The present invention relates particularly but not exclusively to metal coated steel strip that can be cold formed (e.g. by roll forming) into an end-use product, such as roofing products.

The present invention relates more particularly but not exclusively to metal coated steel strip of the type described in the preceding paragraph that has a corrosion-resistant metal coating with small spangles, i.e. a coating with an average spangle size of the order of less than 0.5 mm.

The present invention relates more particularly but not exclusively to metal coated steel strip of the type described above that has a corrosion-resistant metal coating with small spangles and includes an aluminium-zinc-silicon alloy that has a relatively low concentration of silicon and also contains magnesium.

BRIEF DESCRIPTION OF THE DRAWING

FIG. 1 shows micrographs of steel substrates coated with aluminum alloys according to methods of the present disclosure.

DETAILED DESCRIPTION

Conventional aluminium-zinc-silicon alloys used to coat steel strip generally comprise the following ranges in % by weight of the elements aluminium, zinc and silicon:

| | |
|---|---|
| aluminium: | 45.0-60.0; |
| zinc: | 37.0-46.0; and |
| silicon: | 1.2-2.3. |

Conventional aluminium-zinc-silicon alloys may also contain other elements, such as, by way of example, any one or more of iron, vanadium, and chromium, often as impurities.

Conventionally, an aluminium-zinc-silicon alloy coating on steel strip is formed using a hot-dip metal coating method.

In the conventional hot-dip metal coating method steel strip passes through one or more heat treatment furnaces and thereafter into and through a bath of molten aluminium-zinc-silicon alloy contained in a coating pot. A coating of aluminium-zinc-silicon alloy forms on the steel strip as the strip moves through the bath.

In a widely used conventional method the strip moves downwardly into the bath and around one or more sink rolls in the bath and thereafter upwardly from the bath.

It has also been proposed to provide an opening in a bottom wall of a coating pot and to move strip vertically upwardly through the opening into the bath and thereafter from the bath. This method relies on the use of an electromagnetic plugging means that prevents molten aluminium-zinc-silicon alloy flowing downwardly from the pot via the opening.

The applicant has carried out research and development work to optimize the composition and microstructure of aluminium-zinc-silicon alloys and coatings formed from these alloys on steel strip for given end-use applications and to optimize coating practices for forming such coatings on steel strip.

The present invention was made in the course of research and development work that focused on the impact of silicon in aluminium-zinc-silicon alloys and on coating practices for forming such metallic coatings on steel strip, with a particular objective of achieving low levels of silicon in the metallic coatings and a secondary objective of forming coatings with small spangles.

The term "small spangles" is understood herein to mean metal coated strip that has spangles that are less than 0.5 mm, preferably less than 0.2 mm, measured using the average intercept distance method as described in Australian Standard AS1733.

The applicant found in the course of the work that reducing the silicon concentration below the conventional 1.2 wt % minimum mentioned above had advantages in terms of improving corrosion resistance and forming small spangles and disadvantages in terms of growth of an intermetallic alloy layer of aluminium, zinc and iron between the steel strip and the aluminium-zinc-silicon alloy coating.

It is known that aluminium-zinc-silicon alloy coatings with relatively high aluminium contents (as in the production of GALVALUME® coated steel) depend on silicon additions to prevent a strongly exothermic reaction during metallic coating in which the entire coatings become an alloy of aluminium, zinc and iron. Such coatings would be highly brittle and commercially useless.

It is also known that without silicon additions the exothermic reaction is so spectacular as to heat steel substrates such that it glows bright red, and on occasion the coating may actually show combustion.

The basis of the present invention is that the applicant has found that growth of the undesirable intermetallic alloy layer can be suppressed by:
  (a) the addition of magnesium to the aluminium-zinc-silicon alloy composition; and/or
  (b) minimizing the residence time of steel strip in contact with a coating bath.

With regard to point (a), a coated steel strip in accordance with the present invention includes a coating of an aluminium-zinc-silicon alloy on at least one surface of the strip which is characterised in that the aluminium-zinc-silicon alloy contains less than 1.2 wt. % silicon and also contains magnesium.

Preferably the silicon concentration is 0.2-0.5 wt. % and the concentration of magnesium is 0.5-8 wt. %.

Preferably the silicon concentration is at least 0.2 wt. % and less than 1.2 wt. % and the concentration of magnesium is 0.5-1 wt. %.

Preferably the silicon concentration is at least 0.2 wt. %.

In addition to suppressing growth of an intermetallic alloy layer, the magnesium addition to the aluminium-zinc-silicon alloy improves the corrosion resistance of the coating.

Preferably the coating has small spangles, as described herein, i.e. spangles that are less than 0.5 mm, preferably less than 0.2 mm, measured using the average intercept distance method as described in Australian Standard AS1733.

The small spangle size improves the ductility of the coating and compensates for an adverse effect of magnesium on ductility of the coating.

Preferably the magnesium concentration is less than 8 wt. %.

Preferably the magnesium concentration is less than 3 wt. %.

Preferably the magnesium concentration is at least 0.5 wt. %.

Preferably the magnesium concentration is between 1 wt. % and 3 wt. %.

More preferably the magnesium concentration is between 1.5 wt. % and 2.5 wt. %.

Preferably the aluminium-zinc-silicon alloy is a titanium diboride-modified alloy such as described in International application PCT/US00/23164 (WO 01/27343) in the name of Bethlehem Steel Corporation and contains up to 0.5 wt. % boron as titanium diboride. The International application discloses that titanium diboride minimises the spangle size of aluminium-zinc-silicon alloys. The disclosure in the specification of the International application is incorporated herein by cross-reference.

The aluminium-zinc-silicon alloy may contain other elements.

Preferably the aluminium-zinc-silicon alloy contains strontium and/or calcium.

The strontium and/or calcium addition to the aluminium-zinc-silicon alloy substantially reduces the number of surface defects described by the applicant as "rough coating" and "pinhole-uncoated" defects and compensates for the increased number of such surface defects that appear to be caused by magnesium.

The strontium and the calcium may be added separately or in combination.

Preferably the concentration of (i) strontium or (ii) calcium or (iii) strontium and calcium together is at least 2 ppm.

Preferably the concentration of (i) strontium or (ii) calcium or (iii) strontium and calcium together is less than 0.2 wt. %.

Preferably the concentration of (i) strontium or (ii) calcium or (iii) strontium and calcium together is less than 100 ppm.

More preferably the concentration of (i) strontium or (ii) calcium or (iii) strontium and calcium together is no more than 50 ppm.

Preferably the aluminium-zinc-silicon alloy does not contain vanadium and/or chromium as deliberate alloy elements—as opposed to being present in trace amounts for example as unavoidable impurities due to contamination in the molten bath.

With regard to point (b) above, the applicant has found that the above-described coating method of moving steel strip upwardly through a coating pot containing an aluminium-zinc-silicon alloy and having an opening in a bottom wall of the pot is an effective option to minimize residence time of steel strip in contact with the aluminium-zinc-silicon alloy bath in the pot.

Thus, a method of forming a coating of an aluminium-zinc-silicon alloy on a steel strip in accordance with the present invention includes moving steel strip upwardly through a coating pot containing a bath of an aluminium-zinc-silicon alloy and having an opening in a bottom wall of the pot and forming a coating of the alloy on the strip and is characterized by minimizing residence time of steel strip in contact with the aluminium-zinc-silicon alloy bath in the pot.

Preferably the residence time is less than 0.75 seconds.

More preferably the residence time is less than 0.5 seconds.

Preferably the residence time is at least 0.2 seconds.

Preferably the aluminium-zinc-silicon alloy is the above-described low silicon containing alloy and optionally is a magnesium containing alloy.

The method of forming the aluminium-zinc-silicon alloy coating on the steel strip in accordance with the present invention may also include the steps of: successively passing the steel strip through a heat treatment furnace and the bath of molten aluminium-zinc-silicon alloy, and:
(a) heat treating the steel strip in the heat treatment furnace; and
(b) hot-dip coating the strip in the molten bath and forming the coating of the alloy with small spangles on the steel strip.

Preferably the heat treatment furnace has an elongated furnace exit chute or snout that extends into the bath.

According to the present invention there is also provided cold formed products made from the above-described metal coated steel strip.

As is indicated above, the present invention is based on research and development work carried out by the applicant.

The work included a series of experiments designed to evaluate the impact of silicon and magnesium in aluminium-zinc-silicon alloys on the microstructure, and more particularly spangle size and intermetallic alloy layer growth, of coatings of the alloys on steel strip samples.

The experiments were carried out using aluminium-zinc-silicon alloys containing, in wt. %:
(a) 0.5 Si, 0.0 Mg;
(b) 0.5 Si, 2.0 Mg;
(c) 0.28 Si, 0.0 Mg; and
(d) 0.28 Si, 2.0 Mg.

The above-described alloys were coated onto steel samples and the samples were evaluated.

The results of the experiments are summarized in Table 1 below and in the micrographs of FIG. 1.

The samples were found to have an aluminium-zinc-silicon alloy coating and an intermetallic alloy layer between the coating and the steel substrate.

TABLE 1

| Si Content (wt %) | Spangle Size (mm) - 0.0 wt % Mg | Spangle Size (mm) - 2.0 wt. % Mg | Intermetallic Layer Thickness (mm) - 0.0 wt % Mg | Intermetallic Layer Thickness (mm) - 2.0 wt % Mg |
|---|---|---|---|---|
| 0.5 | 0.3 | 0.29 | 5 µm with 10 µm outbursts | 2-3 µm with outbursts up to 6 µm |
| 0.28 | 0.2 | 0.19 | 10 µm with 15 µm outbursts | 2-3 µm with outbursts up to 8 µm |

The micrographs show the steel substrate, the intermetallic alloy layer on the substrate, and the coating (referred to as "Al/Zn layer" in the micrographs) on the intermetallic layer of each sample.

It is evident from Table 1 and the micrographs that:
(a) the thickness of the intermetallic alloy layer increased as the Si concentration decreased—compare the samples containing 0.0 wt. % Mg and the two different concentrations of Si;
(b) the samples containing 2.0 wt. % Mg had substantially less intermetallic alloy layer growth than the samples containing 0.0 wt. % Mg;

(c) Si concentration made very little difference to the thickness of the intermetallic alloy layers in the samples containing 2.0 wt. % Mg; and (d) smaller spangles were formed with samples having the lower Si concentration of 0.28 wt. %.

Many modifications may be made to the preferred embodiment described above without departing from the spirit and scope of the present invention.

What is claimed is:

1. A steel strip having a coating of an aluminum-zinc-silicon alloy on at least one surface of the strip which is characterized in that the aluminum-zinc-silicon alloy contains at least 0.2 wt. % and less than 1.0 wt. % silicon, between 1.5 and 2.5 wt. % magnesium, 37-46 wt. % Zn and 45-60 wt. % aluminium, wherein the aluminium-zinc-silicon alloy contains strontium and/or calcium, and the coating has small spangles that are less than 0.5 mm, and wherein the aluminum-zinc-silicon alloy is a titanium diboride-modified alloy; wherein the aluminium-zinc-silicon alloy does not contain vanadium and/or chromium as deliberate alloy elements—as opposed to being present in trace amounts.

2. The steel strip defined in claim 1 wherein the aluminum-zinc-silicon alloy contains 0.2-0.5 wt. % silicon.

3. The steel strip defined in claim 1, wherein the titanium diboride-modified aluminum-zinc-silicon alloy contains up to 0.5 wt. % boron as titanium diboride.

4. A steel strip having a coating of an aluminum-zinc-silicon alloy on at least one surface of the strip which is characterized in that the aluminum-zinc-silicon alloy contains at least 0.2 wt. % and less than 1.0 wt. % silicon, between 1.5 and 2.5 wt. % magnesium, 37-46 wt. % Zn and 45-60 wt. % aluminium, wherein the aluminium-zinc-silicon alloy contains strontium and/or calcium, and the coating has small spangles that are less than 0.5 mm, wherein the aluminum-zinc-silicon alloy does not contain vanadium and/or chromium as deliberate alloy elements—as opposed to being present in trace amounts.

5. The steel strip defined in claim 4 wherein the aluminum-zinc-silicon alloy contains 0.2-0.5 wt. % silicon.

* * * * *